(12) United States Patent
Moon et al.

(10) Patent No.: US 6,749,315 B2
(45) Date of Patent: Jun. 15, 2004

(54) DIRECT TYPE BACK LIGHT DEVICE

(75) Inventors: Jeong Min Moon, Kyonggi-do (KR); Ju Young Bang, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/179,301

(22) Filed: Jun. 26, 2002

(65) Prior Publication Data

US 2003/0086255 A1 May 8, 2003

(30) Foreign Application Priority Data

Nov. 5, 2001 (KR) ...................................... P2001-68568

(51) Int. Cl.[7] .............................................. G09F 13/04
(52) U.S. Cl. .......................... 362/97; 362/33; 362/225; 362/249; 362/260; 362/396; 362/224; 362/240; 313/318.1
(58) Field of Search .......................... 362/97, 249, 225, 362/224, 240, 260, 33, 396; 313/318.1

(56) References Cited

U.S. PATENT DOCUMENTS 6,527,414 B2 * 3/2003 Moon ........................ 362/249

* cited by examiner

Primary Examiner—Stephen Husar
Assistant Examiner—James W Cranson
(74) Attorney, Agent, or Firm—Morgan, Lewis & Bockius LLP

(57) ABSTRACT

A direct type back light device includes a plurality of luminescent lamps, upper and lower lamp holders formed to receive upper and lower opposite ends of the luminescent lamps, a lower support having lower lamp holder recesses for fixing the lower lamp holders, conductive layers formed upon an area of the lower lamp holders and lower support for receiving the lower opposite ends of the luminescent lamps to supply power to the luminescent lamps, an upper support having upper lamp holder recesses for fixing the upper lamp holders, and conductive layers formed upon an area of the upper lamp holders and upper support for receiving the upper opposite ends of the luminescent lamps to supply the power to the luminescent lamps, wherein the lower and upper supports assemble together to fix the lower and upper opposite ends of the luminescent lamps.

30 Claims, 11 Drawing Sheets

DIRECT TYPE BACK LIGHT DEVICE

The present invention claims the benefit of the Korean Patent Application No. P2001-68568 filed in Korea on Nov. 5, 2001, which is hereby incorporated by reference.

BACKGROUND OF THE INVENTION

1. Field of the Invention

The present invention relates to a back light device, and more particularly, to a direct-type back light device for a liquid crystal display (LCD) device.

2. Discussion of the Related Art

Presently, flat panel display devices have display screens of no more than a few centimeters. The devices, in particular liquid crystal display (LCD) devices, have a wide field of applications including notebook computers, monitors, spacecraft, and aircraft, for example. The LCD devices have a back light device disposed at a rear portion of the LCD panel to function as a light source. The back light device commonly includes a cylindrical fluorescent lamp arranged in either one of a direct-type or a lighting guiding plate-type configuration.

The direct-type back light device is problematic since a minimum gap is required to be maintained between the cylindrical fluorescent lamp and the LCD panel in order to prevent an image of the cylindrical fluorescent lamp from appearing on the LCD panel. In addition, a light scattering system is required to provide a uniform distribution of light. Moreover, the advent of large sized display panels requires an increased light emission surface area of the back light device. Accordingly, the light emission surface area must be of an adequate thickness to prevent any deformation associated with the increased size.

The light guiding plate-type back light device uses a fluorescent lamp that is provided at a side of a light guiding plate to disperse light emitted from the fluorescent lamp onto an entire flat panel display using the light guiding plate. However, the light guiding plate-type back light device is problematic since the combination of the fluorescent lamp and the light guiding plate causes low luminance of the flat panel display. In addition, advanced optical design and processing technologies are required to provide uniform distribution of luminescent intensity.

Figure 1:
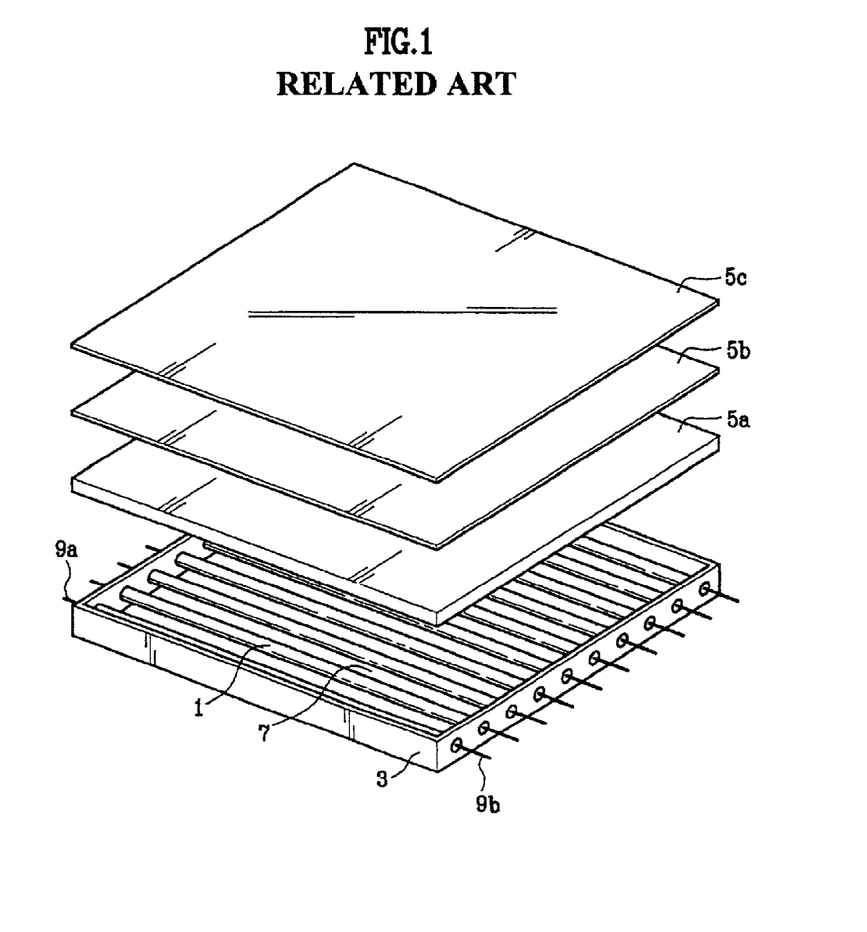
FIG. 1 is a perspective view of a direct-type back light device according to the related art.
Figure 2:
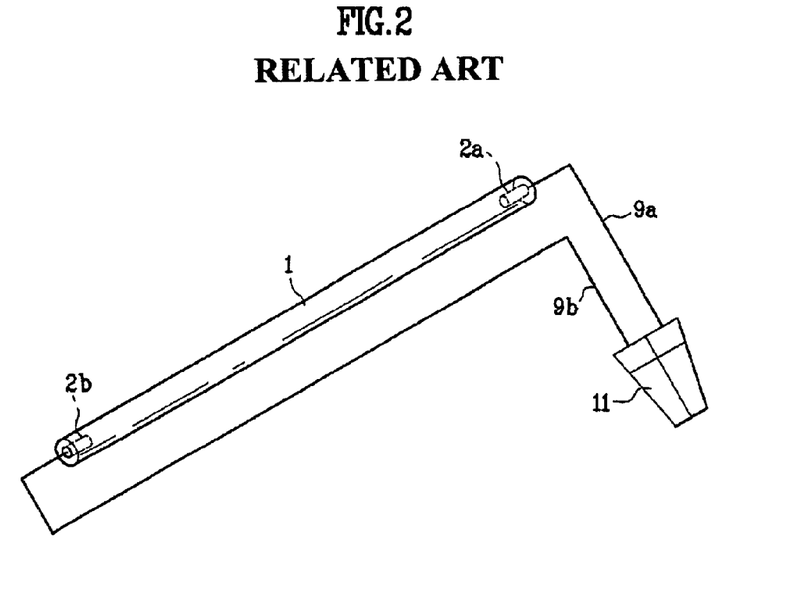
FIG. 2 is a perspective view of a light emitting lamp and connector according to the related art.

The direct-type back light device and the light guiding plate-type back light device each have their own unique problems. For example, direct-type back light devices are commonly used in monitors for personal computers and for televisions because of their relatively high display intensity where overall thickness of the device is unimportant, and light guiding plate-type back light devices are commonly used in notebook computers because of their relatively small overall thickness where display intensity is not very important FIG. 1 is a perspective view of a direct-type back light device according to the related art. In FIG. 1, the direct-type back light device includes a plurality of luminescent lamps 1, an outer case 3 that fixes and supports the luminescent lamps 1, and light scattering system 5a, 5b, and 5c arranged between the luminescent lamps 1 and an LCD panel (not shown). The light scattering system 5a, 5b, and 5c prevents an image of the luminescent lamps 1 from being displayed onto a display screen (not shown) of the LCD panel, and provides for a uniform distribution of light emitted from the luminescent lamps 1. To further enhance a light-scattering effect of the light scattering system 5a, 5b, and 5c, a plurality of diffusion sheets and a plurality of diffusion plates are arranged between LCD panel and the luminescent lamps.

The outer case 3 includes a reflecting plate 7 disposed at an interior of the back light device. The reflecting plate 7 is arranged to focus the light emitted from the luminescent lamp 1 onto a display part of the LCD panel, thereby enhancing light efficiency.

The luminescent lamp 1 is commonly referred to as a cold cathode fluorescent lamp (CCFL) and functions as a light source of an LCD device when a power source is supplied to electrodes 2a and 2b arranged at opposite ends of the luminescent lamp 1. The opposite ends of the luminescent lamp 1 fit into grooves formed at opposing sides of the outer case 3. The electrodes 2a and 2b are connected to power lines 9a and 9b to drive the luminescent lamp 1. The power lines 9a and 9b are fastened to a connector 11 for electrical connection to a driving circuit (not shown). Accordingly, a separate connector 11 is required for each luminescent lamp 1. Moreover, one of the power lines 9a and 9b is curved downwardly toward the outer case 3 and then connected to the connector 11.

However, the back light device according to the related art is problematic. First, since the connector 11 is connected between the power lines 9a and 9b of the luminescent lamp 1 and the driving circuit, a separate connector 11 is required for each luminescent lamp 1. Accordingly, the total number of power lines and connectors becomes very complicated. Moreover, since the power lines 9a and 9b must be separately bent to reduce an overall thickness of the back light device, work processing time increases and productivity deteriorates.

Second, a hole must be formed to pass through the outer case 3 so that the electrodes 9a and 9b are fastened to the connector 11. Accordingly, since the electrodes 9a and 9b must be individually fit through the hole to be exposed at an exterior of the outer case 3, efficiency of the manufacturing process is reduced and any required repairs would not be easily facilitated.

SUMMARY OF THE INVENTION

Accordingly, the present invention is directed to a direct-type back light device that substantially obviates one or more problems due to limitations and disadvantages of the related art.

An object of the present invention is to provide a direct-type back light device that enhances efficiency of the manufacturing process and facilitates repair.

Another object of the present invention is to provide a direct-type back light device that improves light efficiency and prevents damage to the luminescent lamp from external impact.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a direct type back light device includes a plurality of luminescent lamps, upper and lower lamp holders formed to receive upper and lower opposite ends of the luminescent lamps, a lower support having lower lamp holder recesses for fixing the lower lamp holders, conductive layers formed upon an area of the lower lamp holders and lower support for receiving the lower opposite ends of the luminescent lamps to supply power to the luminescent lamps, an upper support having upper lamp holder recesses for fixing the upper lamp holders, and conductive layers formed upon an area of the upper lamp holders and upper support for receiving the upper opposite ends of the luminescent lamps to supply the power to the luminescent lamps, wherein the lower and upper supports assemble together to fix the lower and upper opposite ends of the luminescent lamps.

In another aspect, a direct type back light device includes a plurality of luminescent lamps, lower supports each having a first lower base portion and an interconnecting first upper base portion, conductive layers formed upon the lower supports for receiving the lower opposite ends of the luminescent lamps to supply power to the luminescent lamps, upper supports each having a second lower base portion and an interconnecting second upper base portion; and conductive layers formed upon the upper supports for receiving the upper opposite ends of the luminescent lamps to supply the power to the luminescent lamps, wherein the first lower and upper base portions together with the second lower and upper base portions affix the lower and upper opposite ends of the luminescent lamps.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 3A:
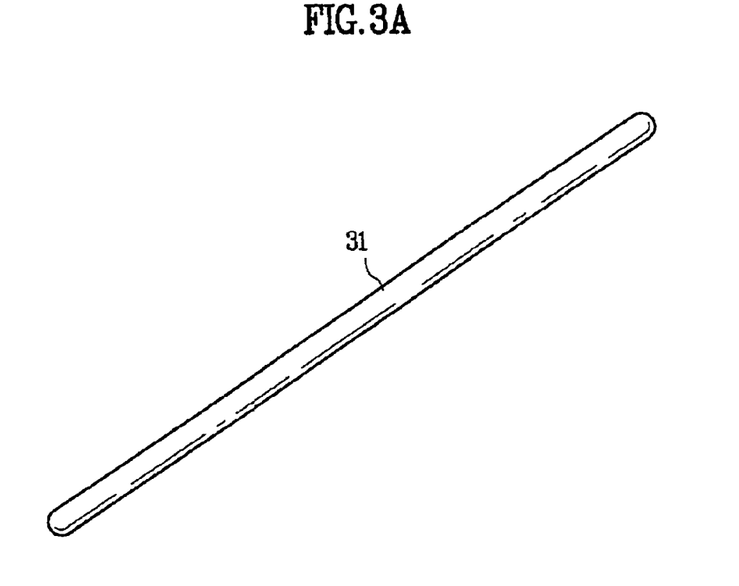
FIGS. 3A and 3B are perspective views of exemplary luminescent lamps according to the present invention.
Figure 3B:
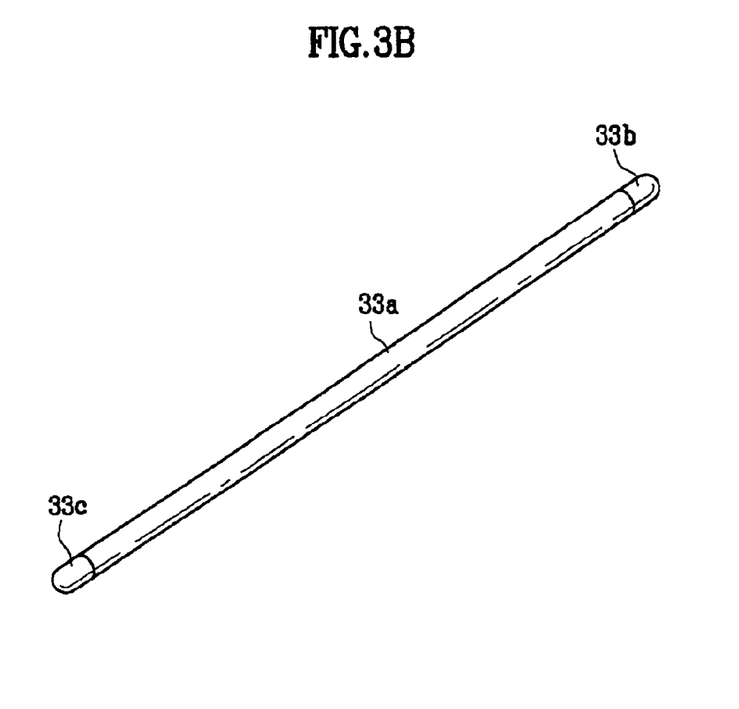

FIGS. 3A and 3B are perspective views of exemplary luminescent lamps according to the present invention. In FIG. 3A, a luminescent lamp 31 may include electrodes (not shown) formed at opposite ends of an interior of the luminescent lamp 31. In FIG. 3B, a luminescent lamp 33a may include electrodes 33b and 33c formed at opposite ends of an exterior of the luminescent lamp 33a. Accordingly, exemplary embodiments shown in FIGS. 4, 6 and 7 may include either one of the electrodeless luminescent lamp 31 shown in FIG. 3A or the luminescent lamp 33a shown in FIG. 3B having electrodes 33b and 33c formed at opposite ends of an exterior of the luminescent lamp 33a.

Figure 4:
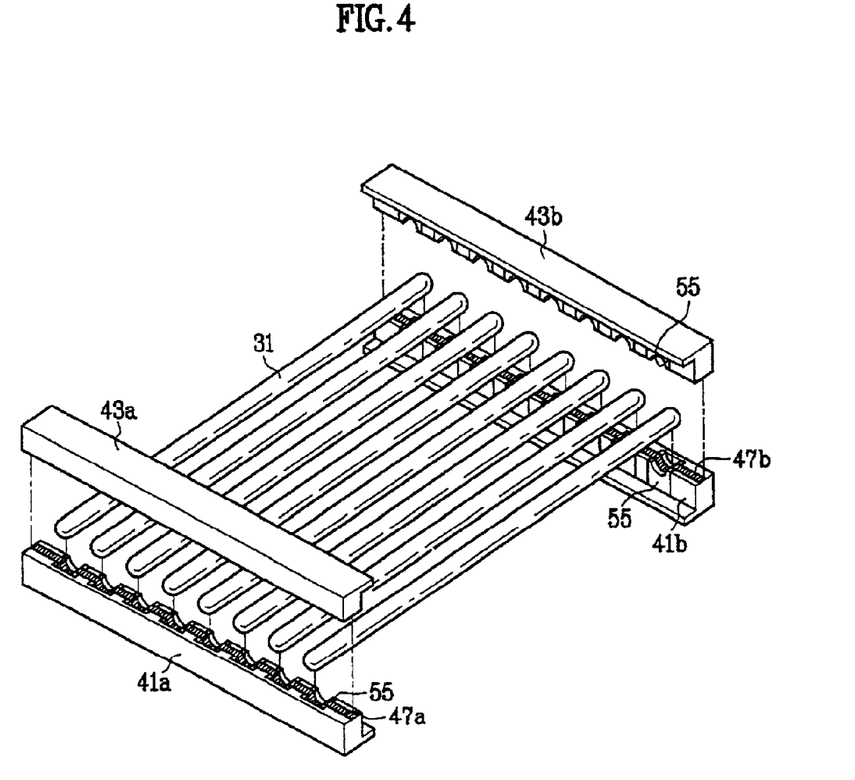
FIG. 4 is a perspective view of a direct-type back light device according to the present invention.

FIG. 4 is a perspective view of a direct-type back light device according to the present invention. In FIG. 4, the direct-type back light device may include a plurality of luminescent lamps 31 arranged in parallel, lamp holders 55 formed to receive the opposite ends of the luminescent lamps 31, first and second lower supports 41a and 41b arranged at a constant interval corresponding to a length of the luminescent lamps 31 and having lamp holder recesses for fixing the lamp holders 55, conductive layers 47a and 47b formed within an area for receiving the opposite ends of the luminescent lamps 31 to supply power to the luminescent lamps 31, and first and second upper supports 43a and 43b arranged at the constant interval to fix and support the luminescent lamps 31 together with the first and second lower supports 41a and 41b. In addition, although not shown, a light-scattering systems such as a diffusion sheet and diffusion plates similar to those of the light scattering system 5a. 5b. and 5c shown in FIG. 1, that scatters light emitted from the luminescent lamps 31 may be further arranged above the first and second upper supports 43a and 43b, thereby uniformly distributing the emitted light onto a display part of an LCD panel.

The conductive layers 47a and 47b may be formed in such a manner that they are coated with a conductive material along a length direction of each of the first and second lower supports 41a and 41b. In addition, if the luminescent lamps 31 have electrodes formed at opposite ends of an exterior of the luminescent lamp 31, then the conductive layers 47a and 47b may function as power connectors. However, if electrodeless luminescent lamps are used, then the conductive layers 47a and 47b may function as electrodes as well as power connectors.

Figure 5A:
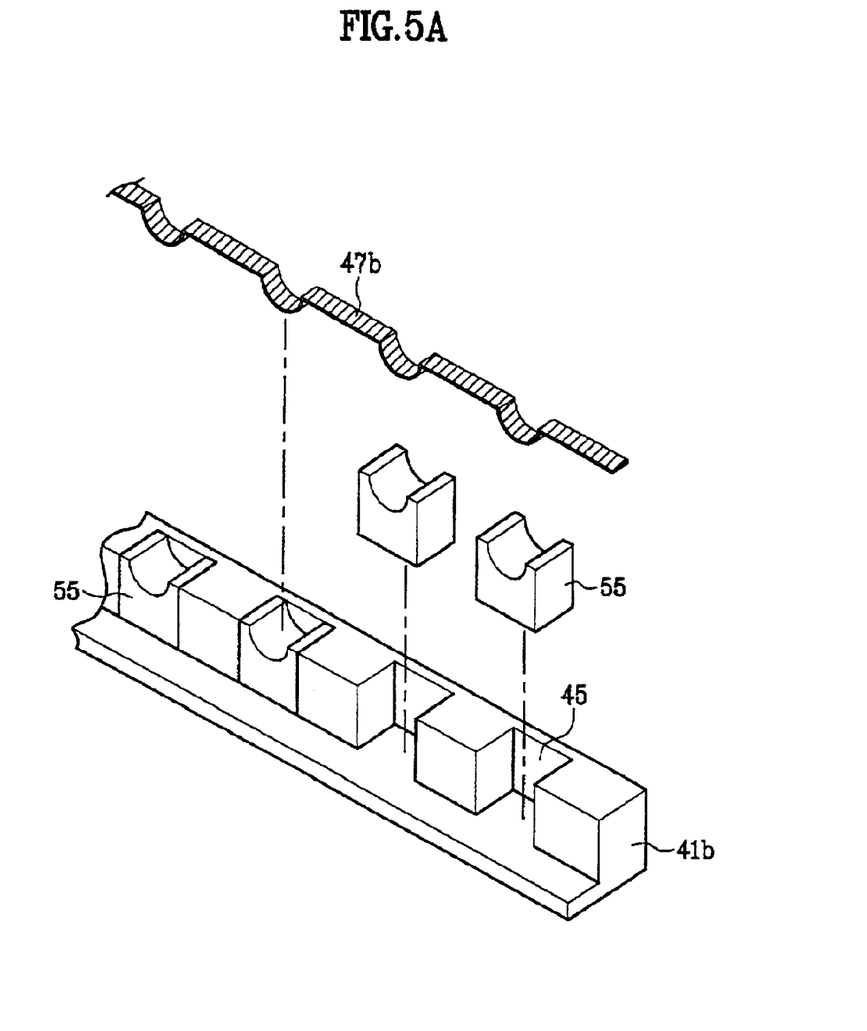
FIGS. 5A to 5E are perspective views illustrating various exemplary supports of a back light device according to the present invention.

FIGS. 5A to 5E are perspective views illustrating various exemplary supports of a back light device according to the present invention. Each of the exemplary supports may be used as both lower and upper supports for the back light device. In FIG. 5A, the second lower support 41b, and also the first lower support 41a, may include a plurality of lamp holder recesses 45. Each of the lamp holder recesses 45 may include at least a three-sided structure completely opened toward an inner side of the second lower support 41b. A plurality of lamp holders 55 formed to receive the opposite ends of the luminescent lamps (31 in FIG. 4) may be fixed within the lamp holder recesses 45, and a conductive layer 47b may be formed upon the lamp holders 55 within the lamp holder recesses 45.

The lamp holders 55 may be formed of an elastic material such as rubber, silicon, and plastic. Accordingly, the lamp holders 55 may prevent the luminescent lamps (31 in FIG. 4) from being damaged by external impact, and adhesion between the luminescent lamp 31 and the conductive layer 47b may be improved. In addition, a conductive material may be formed on the conductive layer 47b to improve adhesion between the luminescent lamps 31 and the conductive layer 47b. The conductive material may include a liquid, gel and powdered material.

Figure 5B:
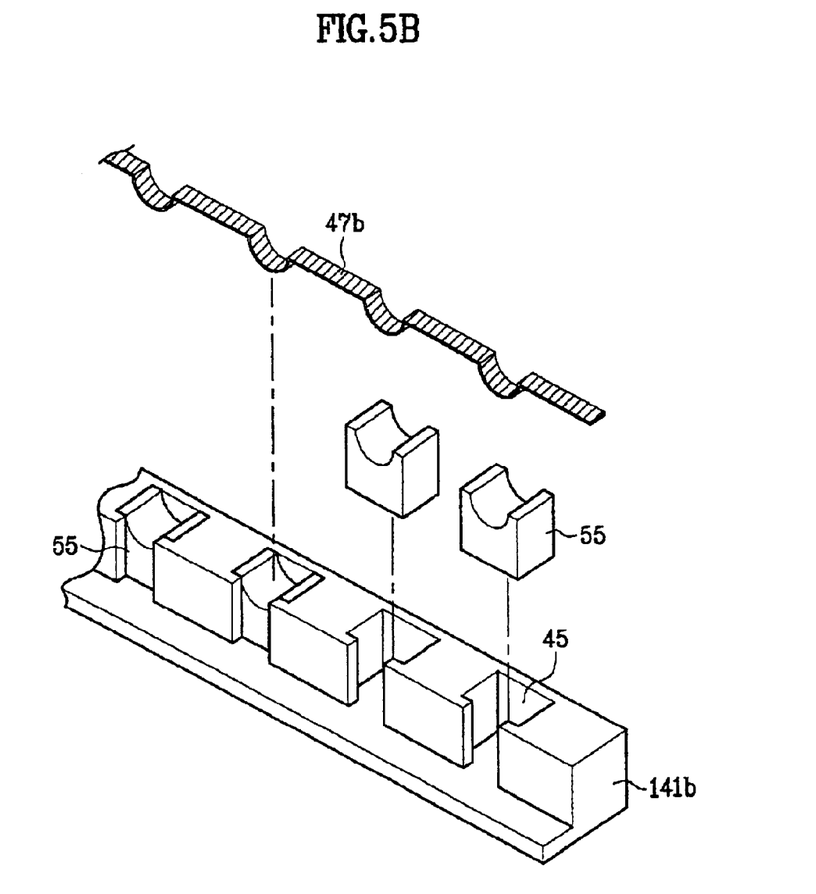

In FIG. 5B, a second lower support 141b, and also a first lower support (not shown), may include a plurality of lamp holder recesses 45. Each of the lamp holder recesses 45 may include at least a four-sided structure in which one side prevents deviation of the lamp holder 55 from the second lower support 141b. The lamp holders 55 may be formed of an elastic material such as rubber, silicon, and plastic. Accordingly, the lamp holders 55 may prevent the luminescent lamps (31 in FIG. 4) from being damaged by external impact, and adhesion between the luminescent lamp 31 and the conductive layer 47b may be improved. In addition, a conductive material may be formed on the conductive layer 47b to improve adhesion between the luminescent lamps 31 and the conductive layer 47b. The conductive material may include a liquid, gel and powdered material.

Figure 5C:
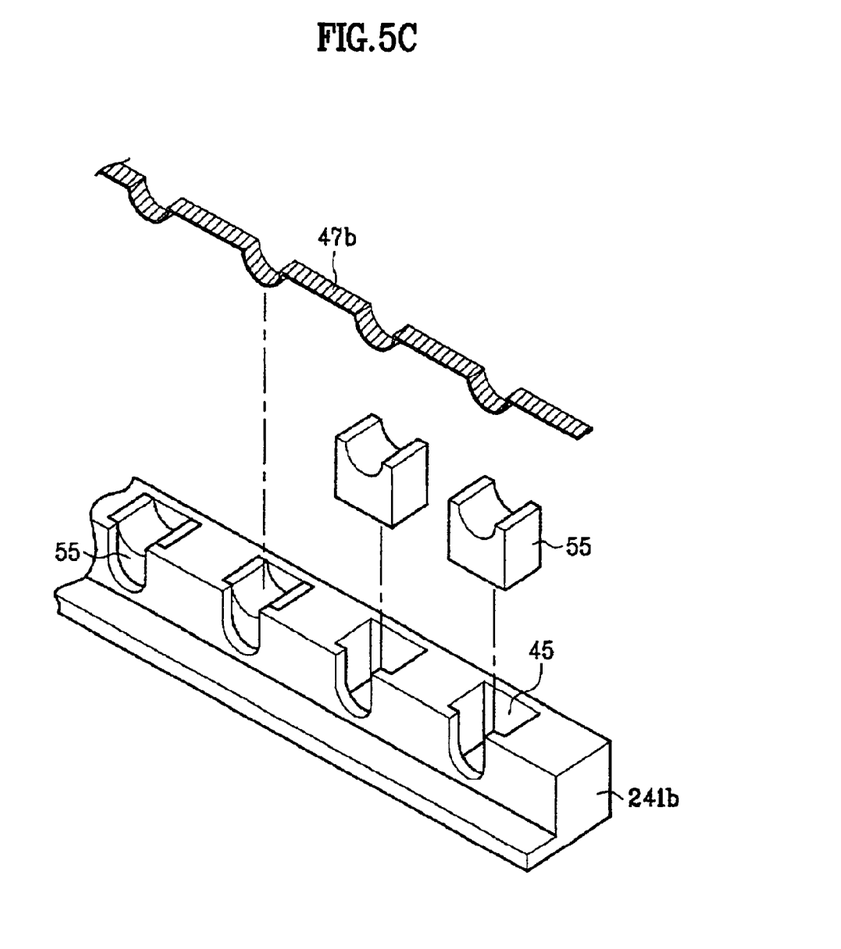

In FIG. 5C, a second lower support 241b, and also a first lower support (not shown), may include a plurality of lamp holder recesses 45. Each of the lamp holder recesses 45 may include at least a four-sided structure in which one side prevents deviation of the lamp holder 55 from the second lower support 141b. Moreover, the one side of the lamp holder recesses 45 may have a U-shape. The lamp holders 55 may be formed of an elastic material such as rubber, silicon, and plastic. Accordingly, the lamp holders 55 may prevent the luminescent lamps (31 in FIG. 4) from being damaged by external impact, and adhesion between the luminescent lamps 31 and the conductive layer 47b may be improved. In addition, a conductive material may be formed on the conductive layer 47b to improve adhesion between the luminescent lamps 31 and the conductive layer 47b. The conductive material may include a liquid, gel and powdered material.

Figure 5D:
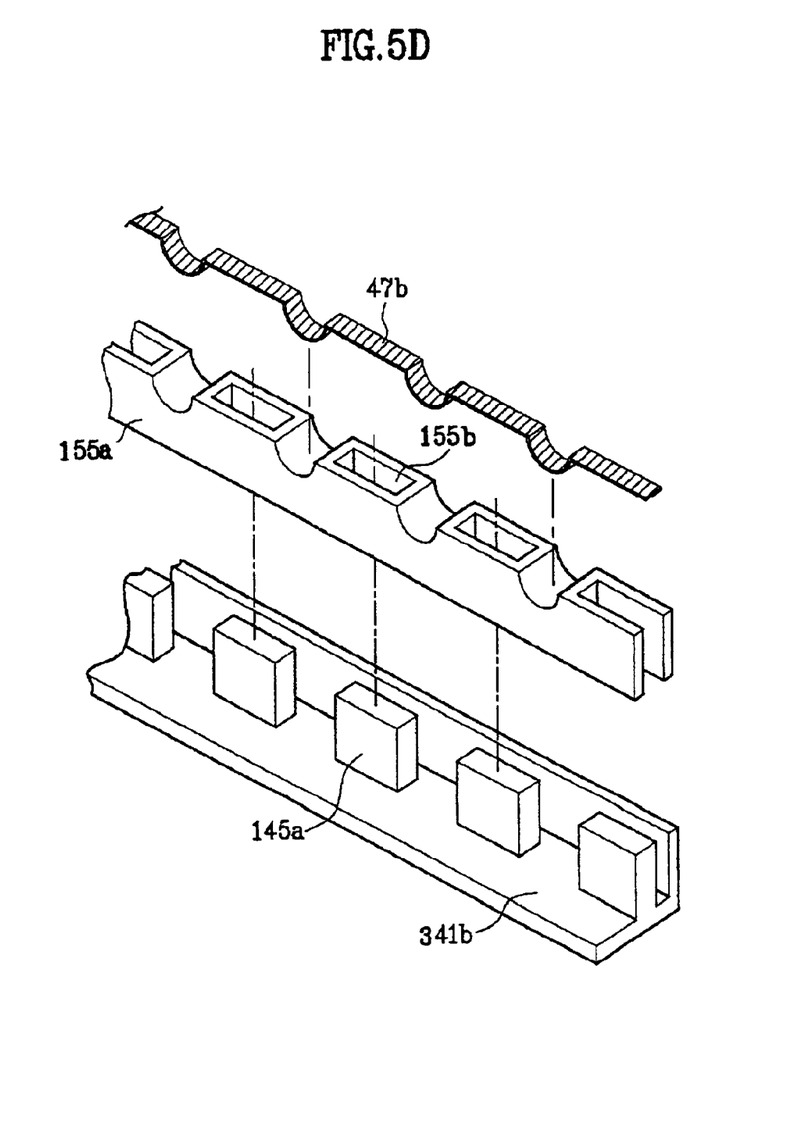

In FIG. 5D, a second lower support, and also a first lower support (not shown) may include a lower base portion 341b and an upper base portion 155a. The lower base portion 341b may include a plurality of column protrusions 145a, and the upper base portion 155a may include a plurality of column receiving openings 155b. When the lower base portion 341b and the upper base portion 155a are assembled, each of the column protrusions 145a are engaged within a corresponding one of the column receiving openings 155b. The upper base portion 155a may be formed of an elastic material such as rubber, silicon, and plastic. Accordingly, the upper base portion 155a may prevent the luminescent lamps (31 in FIG. 4) from being damaged by external impact, and adhesion between the luminescent lamps 31 and the conductive layer 47b may be improved. In addition, a conductive material may be formed on the conductive layer 47b to improve adhesion between the luminescent lamps 31 and the conductive layer 47b. The conductive material may include a liquid, gel and powdered material.

Figure 5E:
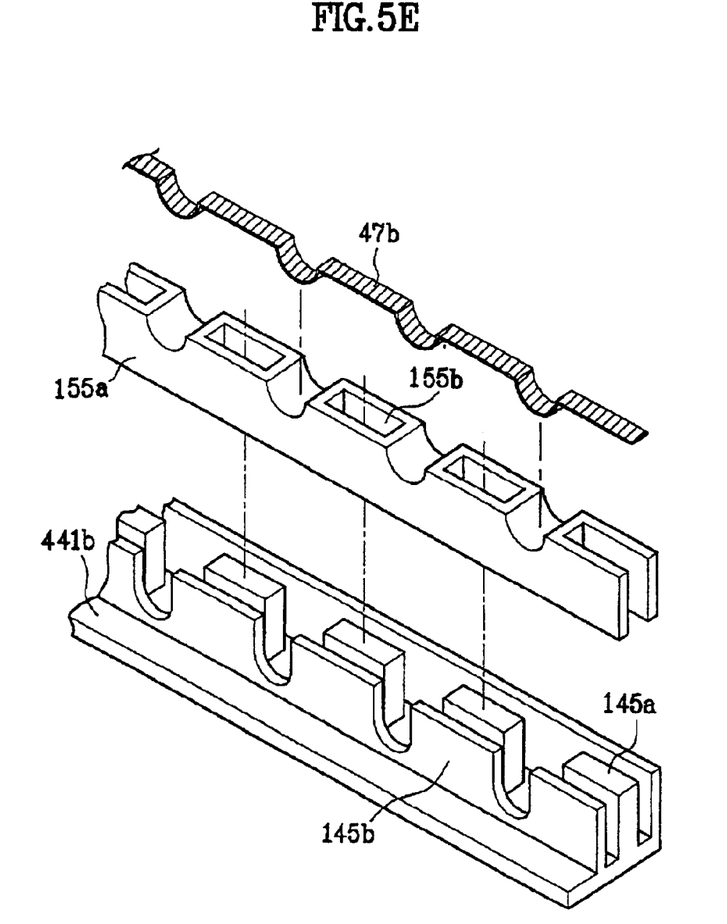

In FIG. 5E, a second lower support, and also a first lower support (not shown) may include a lower base portion 441b and an upper base portion 155a. The lower base portion 441b may include a plurality of column protrusions 145a and a corresponding plurality of barrier walls 145b. When the lower base portion 441b and the upper base portion 155a are assembled, each of the column protrusions 145a are engaged within a corresponding one of the column receiving openings 155b. In addition, the barrier walls 145b provide a stable lateral support for the upper base portion 155a. The upper base portion 155a may be formed of an elastic material such as rubber, silicon, and plastic. Accordingly, the upper base portion 155a may prevent the luminescent lamps (31 in FIG. 4) from being damaged by external impact, and adhesion between the luminescent lamps 31 and the conductive layer 47b may be improved. In addition, a conductive material may be formed on the conductive layer 47b to improve adhesion between the luminescent lamps 31 and the conductive layer 47b. The conductive material may include a liquid, gel and powdered material.

Figure 6:
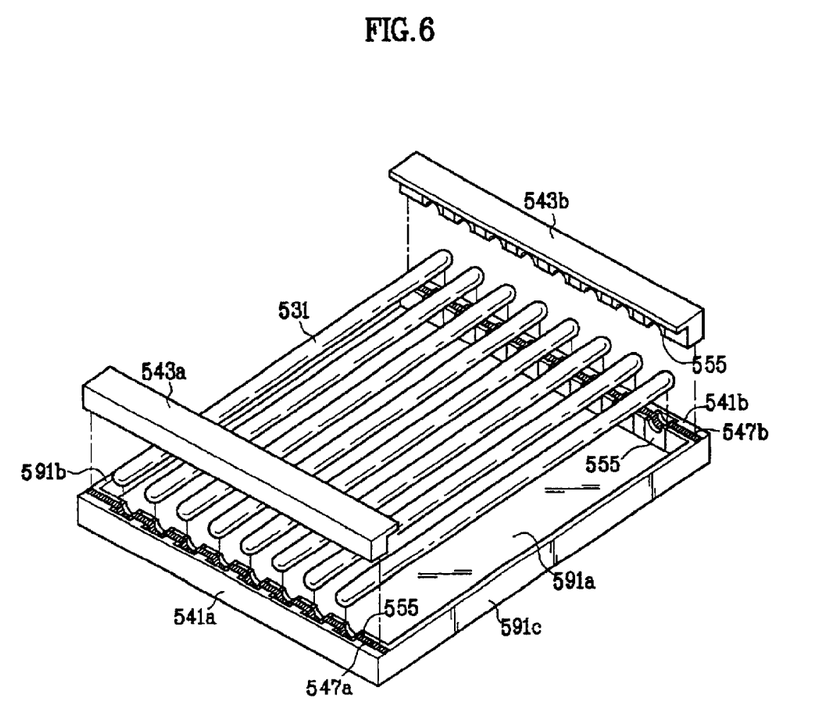
FIG. 6 is a perspective view of an exemplary direct-type back light device according to the present invention.

FIG. 6 is a perspective view of an exemplary direct-type back light device according to the present invention. In FIG. 6, the direct-type back light may include a plurality of luminescent lamps 531 arranged in parallel, lamp holders 555 formed of an elastic material to receive opposite ends of the luminescent lamps 531, first and second lower supports 541a and 541b arranged at a constant interval corresponding to a length of the luminescent lamps 531 and having lamp holder recesses for fixing the lamp holders 555, conductive layers 547a and 547b formed within an area for receiving the opposite ends of the luminescent lamps 531, lower holders 591a, 591b, and 591c formed between the first and second lower supports 541a and 541b to fix and support the first and second lower supports 541a and 541b, and first and second upper supports 543a and 543b arranged at the constant interval to fix and support the luminescent lamps 531 together with the first and second lower supports 541a and 541b. In addition, although not shown, a light-scattering system such as a diffusion sheet and a diffusion plate that scatters light emitted from the luminescent lamps 531 may be further arranged above the first and second upper supports 543a and 543b, thereby uniformly distributing the emitted light onto a display part of an LCD panel.

The lower holders 591a, 591b, and 591c and the first and second lower supports 541a and 541b may be formed in a single body by forming the lower holders 591a, 591b, and 591c along sides of the first and second lower supports 541a and 541b. Furthermore, interior portions of the first and second lower supports 541a and 541b and the lower holders 591a, 591b, and 591c may be formed of a material having excellent light reflectivity, such as a synthetic resin, thereby functioning as reflecting plates. Alternatively, a separate reflecting material may be coated upon interior portions of the first and second lower supports 541a and 541b and the lower holders 591a, 591b, and 591c, thereby focusing light emitted from the luminescent lamps 531 onto an LCD panel (not shown).

The exemplary direct-type back light device shown in FIG. 6 according to the present invention may include a conductive layer, a plurality of lamp holders, and corresponding lamp holder recesses as shown in any of FIGS. 5A to 5E.

Figure 7:
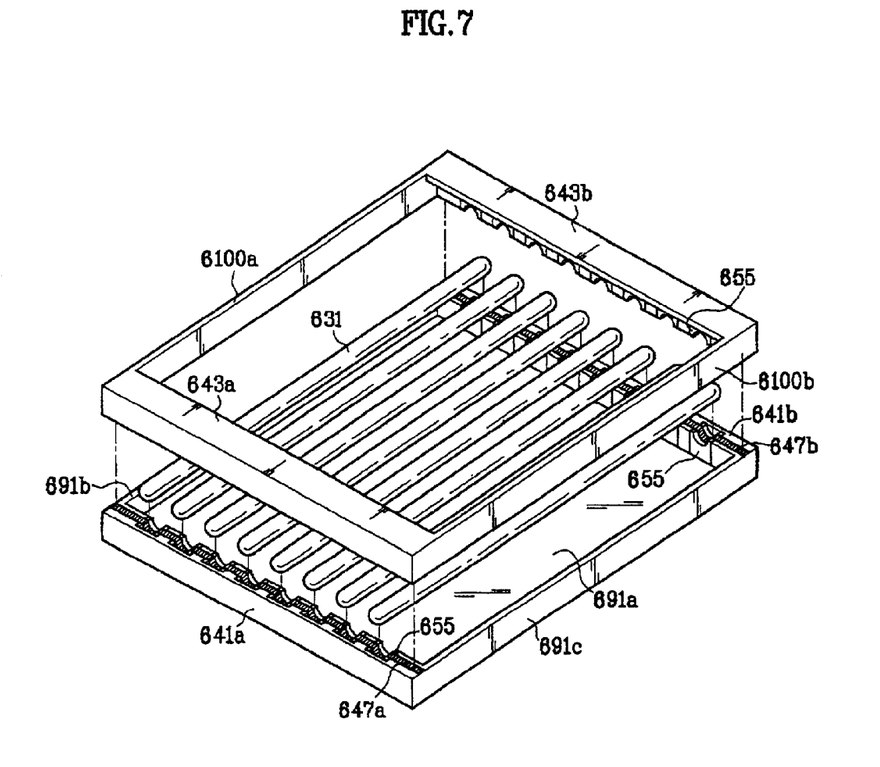
FIG. 7 is a perspective view of another exemplary direct-type back light device according to the present invention.

FIG. 7 is a perspective view of another exemplary direct-type back light device according to the present invention. In FIG. 7, the direct-type back light may include a plurality of luminescent lamps 631 arranged in parallel, lamp holders 655 formed of an elastic material to receive opposite ends of the luminescent lamps 631, first and second lower supports 641a and 641b arranged at a constant interval corresponding to a length of the luminescent lamps 631 and having lamp holder recesses for fixing the lamp holders 655, conductive layers 647a and 647b formed within an area for receiving the opposite ends of the luminescent lamps 631, lower holders 691a, 691b, and 691c formed between the first and second lower supports 641a and 641b to fix and support the first and second lower supports 641a and 641b, first and second upper supports 643a and 643b arranged at the constant interval to fix and support the luminescent lamps 631 together with the first and second lower supports 641a and 641b, and upper holders 6100a and 6100b formed between the first and second upper supports 643a and 643b to fix and support the first and second upper supports 643a and 643b. In addition, although not shown, a light-scattering system such as a diffusion sheet and a diffusion plate that scatters light emitted from the luminescent lamps 631 may be further arranged above the first and second upper supports 643a and 643b and the upper holders 6100a and 6100b, thereby uniformly distributing the emitted light onto a display part of an LCD panel (not shown).

The lower holders 691a, 691b, and 691c and the first and second lower supports 641a and 641b may be formed in a single body by forming the lower holders 691a, 691b, and 691c along sides of the first and second lower supports 641a and 641b. Likewise, the upper holders 6100a and 6100b and the first and second upper supports 643a and 643b may be formed in a single body by forming the upper holders 6100a and 6100b along sides of the first and second upper supports 643a and 643b. Furthermore, interior portions of the first and second lower supports 641a and 64 1b, the lower holders 691a, 691b, and 691c, and the upper holders 6100a and 6100b may be formed of a material having excellent light reflectivity, such as a synthetic resin, thereby functioning as reflecting plates. Alternatively, a separate reflecting material may be coated upon interior portions of the first and second lower supports 641a and 641b, the lower holders 691a, 691b, and 691c, and the upper holders 6100a and 6100b, thereby focusing light emitted from the luminescent lamps 631 onto an LCD panel (not shown).

The exemplary direct-type back light device shown in FIG. 7 according to the present invention may include a conductive layer, a plurality of lamp holders, and corresponding lamp holder recesses as shown in any of FIGS. 5A to 5E.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A direct type back light device, comprising:
    a plurality of luminescent lamps;
    upper and lower lamp holders formed to receive upper and lower opposite ends of the luminescent lamps;
    a lower support having lower lamp holder recesses for fixing the lower lamp holders;
    conductive layers formed upon an area of the lower lamp holders and lower support for receiving the lower opposite ends of the luminescent lamps to supply power to the luminescent lamps;
    an upper support having upper lamp holder recesses for fixing the upper lamp holders; and
    conductive layers formed upon an area of the upper lamp holders and upper support for receiving the upper opposite ends of the luminescent lamps to supply the power to the luminescent lamps,
    wherein the lower and upper supports assemble together to fix the lower and upper opposite ends of the luminescent lamps.

2. The device according to claim 1, wherein the lower support includes first and second lower supports arranged at a constant interval corresponding to a length of the luminescent lamps.

3. The device according to claim 2, further comprising a lower holder formed between the first and second lower supports.

4. The device according to claim 3, wherein the lower holder includes a light-reflecting material.

5. The device according to claim 1, wherein the lower holder includes an interior surface having a coating of a reflecting material.

6. The device according to claim 1, wherein the upper support includes first and second upper supports arranged at a constant interval corresponding to a length of the luminescent lamps.

7. The device according to claim 6, further comprising at least one upper holder that connects opposing ends of the first and second upper supports.

8. The device according to claim 1, further comprising a light-scattering system formed above the upper support.

9. The device according to claim 1, wherein the lamp holders include an elastic material.

10. The device according to claim 9, wherein the elastic material includes rubber, silicon, and plastic.

11. The device according to claim 1, further comprising a conductive material formed upon the conductive layers of the lower and upper supports.

12. The device according to claim 11, wherein the conductive material includes a liquid, gel, and powdered material.

13. The device according to claim 1, wherein the lower lamp holders are arranged along a length of the lower support.

14. The device according to claim 13, wherein a total number of the lower lamp holders is equal to a total number of the luminescent lamps.

15. The device according to claim 1, wherein the upper lamp holders are arranged along a length of the upper support.

16. The device according to claim 15, wherein a total number of the upper lamp holders is equal to a total number of the luminescent lamps.

17. The device according to claim 1, wherein the lower and upper lamp holder recesses each have at least three sides.

18. The device according to claim 17, wherein the lower and upper lamp holder recesses each have a partial fourth side that exposes a side surface of each of the lower and upper lamp holders.

19. The device according to claim 18, wherein the partial fourth side is a U-shape.

20. The device according to claim 1, wherein the lower and upper lamp holders each have curved surface to receive the lower and upper opposite ends of the luminescent lamps.

21. A direct type back light device, comprising:
    a plurality of luminescent lamps;
    lower supports each having a first lower base portion and an interconnecting first upper base portion;
    conductive layers formed upon the lower supports for receiving the lower opposite ends of the luminescent lamps to supply power to the luminescent lamps;
    upper supports each having a second lower base portion and an interconnecting second upper base portion; and
    conductive layers formed upon the upper supports for receiving the upper opposite ends of the luminescent lamps to supply the power to the luminescent lamps,
    wherein the first lower and upper base portions together with the second lower and upper base portions affix the lower and upper opposite ends of the luminescent lamps.

22. The device according to claim 21, wherein the first and second lower base portions include a plurality of column protrusions.

23. The device according to claim 21, wherein the first and second upper base portions include a plurality of column receiving openings.

24. The device according to claim 21, wherein the first and second upper base portions each include a plurality of recesses for receiving the lower and upper opposite ends of the luminescent lamps.

25. The device according to claim 21, wherein the first and second upper base portions include an elastic material.

26. The device according to claim 25, wherein the elastic material includes rubber, silicon, and plastic.

27. The device according to claim 21, further comprising a conductive material formed upon the conductive layers of the lower and upper supports.

28. The device according to claim 27, wherein the conductive material includes a liquid, gel, and powdered material.

29. The device according to claim 21, wherein the first and second lower base portions include a light-reflecting material.

30. The device according to claim 21, wherein the first and second lower base portions includes an interior surface having a coating of a reflecting material.

* * * * *